US010784508B2

(12) United States Patent
Ni et al.

(10) Patent No.: US 10,784,508 B2
(45) Date of Patent: Sep. 22, 2020

(54) PREPARATION METHOD OF MODIFIED POSITIVE ELECTRODE ACTIVE MATERIAL

(71) Applicant: CONTEMPORARY AMPEREX TECHNOLOGY CO., LIMITED, Ningde (CN)

(72) Inventors: Huan Ni, Ningde (CN); Yujun Chen, Ningde (CN); Xinliang Kuang, Ningde (CN); Xuguang Gao, Ningde (CN); Long Wang, Ningde (CN); Na Liu, Ningde (CN)

(73) Assignee: CONTEMPORARY AMPEREX TECHNOLOGY CO., LIMITED, Ningde, Fujian Province (CN)

( * ) Notice: Subject to any disclaimer, the term of this patent is extended or adjusted under 35 U.S.C. 154(b) by 198 days.

(21) Appl. No.: 15/976,713

(22) Filed: May 10, 2018

(65) Prior Publication Data
US 2018/0337401 A1 Nov. 22, 2018

(30) Foreign Application Priority Data

May 19, 2017 (CN) .......................... 2017 1 0357028

(51) Int. Cl.
*H01M 4/36* (2006.01)
*C01B 25/36* (2006.01)
(Continued)

(52) U.S. Cl.
CPC ............ *H01M 4/366* (2013.01); *C01B 25/36* (2013.01); *C01G 53/42* (2013.01); *C01G 53/50* (2013.01);
(Continued)

(58) Field of Classification Search
CPC .... H01M 4/366; H01M 4/0471; H01M 4/131; H01M 4/1391; C01B 25/36; C01B 53/42; C01B 53/50; C01G 53/42; C01G 53/50
(Continued)

(56) References Cited

U.S. PATENT DOCUMENTS 8,597,818 B2 * 12/2013 Li ....................... H01M 2/1686
429/129
8,980,140 B2 * 3/2015 Huang ................ H01M 4/1397
252/182.1

(Continued)

FOREIGN PATENT DOCUMENTS

CN 102332563 A 1/2012
CN 102347471 A 2/2012
(Continued)

OTHER PUBLICATIONS

Machine translation of CN 105720257 (no date).*
(Continued)

*Primary Examiner* — Amanda C. Walke
(74) *Attorney, Agent, or Firm* — Morgan, Lewis & Bockius LLP

(57) ABSTRACT

The present disclosure provides a preparation method of a modified positive electrode active material preparation method, which comprising steps of: dispersing a positive electrode active material matrix into an alcohol solvent to form a positive electrode active material matrix suspension; dissolving an alcohol-soluble aluminum salt in an alcohol solvent to form an alcohol-soluble aluminum salt solution; dissolving an alcohol-soluble phosphorous compound in an alcohol solvent to form an alcohol-soluble phosphorous compound solution; mixing the alcohol-soluble aluminum salt solution and the alcohol-soluble phosphorous compound solution and heating to react, obtaining a liquid-phase coating solution which contains aluminum phosphate after the
(Continued)

reaction is finished; mixing and stirring the positive electrode active material matrix suspension and the liquid-phase coating solution which contains aluminum phosphate, extraction filtrating and obtaining a filter cake after the stirring is finished, then drying and baking the filter cake, finally obtaining a modified positive electrode active material.

11 Claims, 3 Drawing Sheets

(51) Int. Cl.

| | | |
|---|---|---|
| *C01G 53/00* | (2006.01) | |
| *H01M 4/62* | (2006.01) | |
| *H01M 4/505* | (2010.01) | |
| *H01M 10/0525* | (2010.01) | |
| *H01M 4/525* | (2010.01) | |
| *H01M 10/052* | (2010.01) | |
| *H01M 4/04* | (2006.01) | |
| *H01M 4/1391* | (2010.01) | |
| *H01M 4/131* | (2010.01) | |
| *H01M 4/02* | (2006.01) | |

(52) U.S. Cl.
CPC ......... *H01M 4/0471* (2013.01); *H01M 4/131* (2013.01); *H01M 4/1391* (2013.01); *H01M 4/505* (2013.01); *H01M 4/525* (2013.01); *H01M 4/628* (2013.01); *H01M 10/052* (2013.01); *H01M 10/0525* (2013.01); *C01P 2004/03* (2013.01); *C01P 2004/80* (2013.01); *C01P 2006/40* (2013.01); *H01M 2004/028* (2013.01); *H01M 2220/20* (2013.01)

(58) Field of Classification Search
USPC ........................................................ 429/223
See application file for complete search history.

(56) References Cited

U.S. PATENT DOCUMENTS

| | | | | |
|---|---|---|---|---|
| 9,203,087 | B2* | 12/2015 | Huang | H01M 4/131 |
| 9,331,337 | B2* | 5/2016 | Matsumoto | H01M 4/131 |
| 2004/0138058 | A1* | 7/2004 | Sambasivan | C23C 22/74 |
| | | | | 502/208 |
| 2012/0028120 | A1* | 2/2012 | Huang | H01M 4/131 |
| | | | | 429/221 |
| 2014/0162157 | A1* | 6/2014 | Jeong | H01M 8/04559 |
| | | | | 429/431 |
| 2016/0126542 | A1* | 5/2016 | Han | H01M 4/366 |
| | | | | 429/223 |
| 2017/0149061 | A1* | 5/2017 | Kim | H01M 10/0525 |
| 2018/0309131 | A1* | 10/2018 | He | C01B 25/36 |
| 2018/0309132 | A1* | 10/2018 | He | C01B 25/36 |
| 2019/0140265 | A1* | 5/2019 | Miara | H01M 4/366 |

FOREIGN PATENT DOCUMENTS

| | | |
|---|---|---|
| CN | 102347473 A | 2/2012 |
| CN | 105720257 A | 6/2016 |

OTHER PUBLICATIONS

Machine translation of CN 102332563 (no date).*
Deu et al, Aluminum Borate Coating on High-Voltage Cathodes for Li-Ion Batteries, Journal of the Electrochemical Soceity, 162 (12), A2259-A2265 (2015) (Year: 2015).*
Li et al, AlPO4 coated LiNi1/3Co1/3Mn1/3O2 for high performance cathode material in lithium batteries, Jouernal of Materials Science:Materials in Electronics, 28, 1925-1930 (2017) (Year: 2017).*
Contemporary Amperex Technology Co. Ltd., Extended European Search Report, EP18172241.4, dated Aug. 28, 2018, 10 pgs.
Tan, K S et al., Effect of AlPO4-coating of cathodic behaviour of Li(Nio.8Co0.2)02, Journal of Power Sources, Elsevier SA, Ch, vol. 141, No. 1, Feb. 16, 2005, 14 pgs.
Contemporary Amperex Technology Co. Ltd., First Office Action, CN201710357028.4, dated Oct. 21, 2019, 7 pgs.
Contemporary Amperex Technology Co. Ltd., Communication Pursuant to Article 94(3), EP18172241.4, dated Oct. 7, 2019, 8 pgs.
Cho J et al, Control of AlPO4-nanoparticle coating on LiCoO2 by using water or ethanol, Electrochimica Acta, Jul. 25, 2005, pp. 4182-4187, vol. 50, No. 20, Elsevier, Amsteroam, NL, 6 pgs.
Jian-Hua Wang et al, Effect of heat-treatment on the surface structure and electrochemical behavior of AlPO4-coated LiNi1/3Co1/3Mn1/3O2 cathode materials, Journal of Materials Chemistry A, Jan. 1, 2013, p. 4879, vol. 1, No. 15, Royal society of Chemistry, GB, 6 pgs.

* cited by examiner

PREPARATION METHOD OF MODIFIED POSITIVE ELECTRODE ACTIVE MATERIAL

CROSS-REFERENCE TO RELATED APPLICATIONS

The present application claims priority to Chinese patent application No. CN201710357028.4, filed on May 19, 2017, which is incorporated herein by reference in its entirety.

FIELD OF THE PRESENT DISCLOSURE

The present disclosure relates to the field of energy storage device, and more specifically relates to a preparation method of a modified positive electrode active material.

BACKGROUND OF THE PRESENT DISCLOSURE

With the popularization and development of electric vehicles, people's requirements of a battery become more and more strict, such as the requirement that the battery must have high energy density, long cycle performance, high safety and stability performance. The advantage of high energy density of a lithium-ion battery makes it take up the dominant position in the market compared with other kinds of batteries. With the change of the government policy of the electric vehicles, the requirement of the lithium-ion battery with higher energy density becomes more urgent, which makes nickel-rich positive electrode active material become the best choice for the development and application of the lithium-ion battery at present and in the future.

When voltage of the lithium-ion battery is increased or the nickel-rich positive electrode active material is used in order to meet the requirements of product for high energy density of the lithium-ion battery, the safety performance of the lithium-ion battery remains in doubt. For example, when using the nickel-rich positive electrode active material, the number of stable $Ni^{2+}$ to be transformed into unstable $Ni^{3+}$ will be increased in order to maintain electric charge balance due to the increasing of a content of nickel, plenty of side reactions will occur between the nickel-rich positive electrode active material and the electrolyte, which will produce gas and lead the volume of the lithium-ion battery expand. This will not only damage the lithium-ion battery and affect the service life of the lithium-ion battery, but also damage the equipment using the lithium-ion battery. In serious cases, there are risks of a fire or other safety accidents due to occurrence of short circuit in the lithium-ion battery owing to its volume expansion and deformation, or due to occurrence of combustible electrolyte leakage owing to the burst of the outer case of the lithium-ion battery. For the same reason as above (the number of stable $Ni^{2+}$ to be transformed into unstable $Ni^{3+}$ will be increased), the structure stability of the nickel-rich positive electrode active material will become worse, layered structure material will be transformed to rock-salt structure NiO, which will influence capacity and cycle performance of the lithium-ion battery. Therefore, effective technology is needed to improve surface stability of the positive electrode active material and reduce gas production of the lithium-ion battery.

At present, manufacturers of the positive electrode active material usually mix the positive electrode active material with nanocompound (such as aluminum oxide, zirconium oxide, magnesium oxide, titanium dioxide and aluminum phosphate) in solid state, and then a coating layer is formed after a second sintering process to stabilize the surface of the positive electrode active material. As a result, it can reduce the direct contact between the surface of the positive electrode active material and the electrolyte, and decrease the occurrence of side reactions on the surface to a certain extent, so as to reduce gas production of the lithium-ion battery and improve cycle performance. However the coating layer will be not uniformly coated on the surface of the positive electrode active material by this method, and can only protect the positive electrode active material in a certain extent, therefore how to achieve uniform coating has always been the common direction of the industry efforts.

SUMMARY OF THE PRESENT DISCLOSURE

In view of the problems existing in the background, one object of the present disclosure is to provide a preparation method of a modified positive electrode active material, which can uniformly, continuously and densely coat an aluminum phosphate layer on a surface of a positive electrode active material matrix so as to effectively isolate direct contact between the positive electrode active material matrix and an electrolyte, and reduce side reactions between the positive electrode active material matrix and the electrolyte, and reduce gas production of an electrochemical energy storage device and improve high temperature storage performance of the electrochemical energy storage device.

Another object of the present disclosure is to provide a preparation method of a modified positive electrode active material, the modified positive electrode active material obtained by which has excellent structure stability and can effectively improve cycle stability of the electrochemical energy storage device.

In order to achieve the above objects, the present disclosure provides a preparation method of a modified positive electrode active material, which comprises steps of: dispersing a positive electrode active material matrix into an alcohol solvent to form a positive electrode active material matrix suspension; dissolving an alcohol-soluble aluminum salt in an alcohol solvent to form an alcohol-soluble aluminum salt solution; dissolving an alcohol-soluble phosphorous compound in an alcohol solvent to form an alcohol-soluble phosphorous compound solution; mixing the alcohol-soluble aluminum salt solution and the alcohol-soluble phosphorous compound solution and heating to react, obtaining a liquid-phase coating solution which contains aluminum phosphate after the reaction is finished; mixing and stirring the positive electrode active material matrix suspension and the liquid-phase coating solution which contains aluminum phosphate, extraction filtrating and obtaining a filter cake after the stirring is finished, then drying and baking the filter cake, finally obtaining a modified positive electrode active material in which an aluminum phosphate layer is uniformly coated on a surface of the positive electrode active material matrix.

Compared to the prior art, the present disclosure has the following beneficial effects: the preparation method of the modified positive electrode active material can uniformly, continuously and densely coat the aluminum phosphate layer on the surface of the positive electrode active material matrix so as to effectively isolate direct contact between the positive electrode active material matrix and an electrolyte, and reduce side reactions between the positive electrode active material matrix and the electrolyte, and reduce gas production of an electrochemical energy storage device and improve high temperature storage performance of the electrochemical energy storage device. Meanwhile the modified positive electrode active material obtained by which has

DETAILED DESCRIPTION

Figure 1:
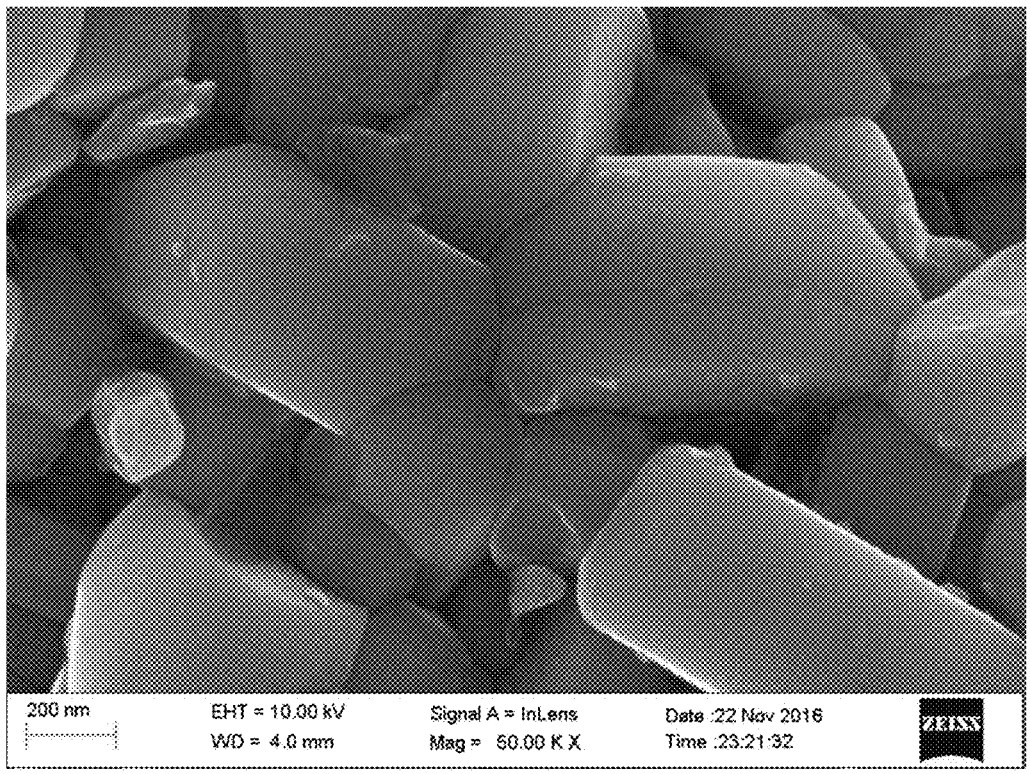
FIG. 1 illustrated a SEM picture of a positive electrode active material without coating modification in comparative example 1.

Hereinafter a preparation method of a modified positive electrode active material according to the present disclosure is described in detail.

Firstly, a preparation method of a modified positive electrode active material according to a first aspect of the present disclosure is described.

The preparation method of the modified positive electrode active material according to the first aspect of the present disclosure comprises steps of: dispersing a positive electrode active material matrix into an alcohol solvent to form a positive electrode active material matrix suspension; dissolving an alcohol-soluble aluminum salt in an alcohol solvent to form an alcohol-soluble aluminum salt solution; dissolving an alcohol-soluble phosphorous compound in an alcohol solvent to form an alcohol-soluble phosphorous compound solution; mixing the alcohol-soluble aluminum salt solution and the alcohol-soluble phosphorous compound solution, heating to react, obtaining a liquid-phase coating solution which contains aluminum phosphate after the reaction is finished; mixing and stirring the positive electrode active material matrix suspension and the liquid-phase coating solution which contains aluminum phosphate, extraction filtrating and obtaining a filter cake after the stirring is finished, then drying and baking the filter cake, finally obtaining a modified positive electrode active material in which an aluminum phosphate layer is uniformly coated on a surface of the positive electrode active material matrix.

In the preparation method of the modified positive electrode active material according to the first aspect of the present disclosure, in the alcohol-soluble phosphorous compound solution, esterification reaction will occur between the alcohol-soluble phosphorous compound and the alcohol solvent after the alcohol-soluble phosphorous compound is dissolved in the alcohol solvent to obtain a chain phosphate ester; after the alcohol-soluble aluminum salt is added into the alcohol-soluble phosphorous compound solution, reaction will occur between the alcohol-soluble aluminum salt and the chain phosphate ester to form the liquid-phase coating solution which contains aluminum phosphate, the obtained liquid-phase coating solution which contains aluminum phosphate is uniform and stable, when the positive electrode active material matrix is added, the aluminum phosphate in the liquid-phase coating solution is adequately coated on a surface of a secondary particle of the positive electrode active material matrix under stirring, then after extraction filtrating, drying and baking, the modified positive electrode active material with the aluminum phosphate layer uniformly, continuously and densely coated on the surface is obtained. The modified positive electrode active material obtained by the preparation method of the modified positive electrode active material of the present disclosure can form an uniform aluminum phosphate layer coated on the surface of the secondary particle of the positive electrode active material matrix, such an uniform, continuous and dense aluminum phosphate layer can effectively isolate the direct contact between the positive electrode active material matrix and an electrolyte, and reduce the side reaction between the positive electrode active material matrix and the electrolyte, and decrease gas production of an electrochemical energy storage device, and effectively improve high temperature storage performance of the electrochemical energy storage device. Meanwhile the modified positive electrode active material obtained by this method has excellent structure stability, which can inhibit the phase change of the positive electrode active material matrix, thereby improving cycle performance of the electrochemical energy storage device, and reducing capacity loss of the electrochemical energy storage device. Moreover, reaction will occur between free metal ions (such as free lithium ions, etc.) of the positive electrode active material matrix and materials of the aluminum phosphate coating layer during the baking process of preparation of the modified positive electrode active material, thereby reducing a content of the free metal ions, reducing gas production of the electrochemical energy storage device, improving processing performance of the positive electrode active material matrix in slurrying process; proper amount of the aluminum phosphate coating layer can also reduce polarization of the positive electrode active material matrix, thereby reducing internal resistance of the electrochemical energy storage device, reducing energy loss of the electrochemical energy storage device during using process, thereby further improving cycle performance of the electrochemical energy storage device.

In the preparation method of the modified positive electrode active material according to the first aspect of the present disclosure, in the positive electrode active material matrix suspension, a mass ratio of the alcohol solvent may be 30%~70% of a mass of the positive electrode active material matrix. If the mass ratio of the alcohol solvent is less than 30%, the positive electrode active material matrix will not be dispersed uniformly, which will affect uniformity, continuity and density of the subsequent aluminum phosphate coating layer. If the mass ratio of the alcohol solvent is more than 70%, the concentration of the positive electrode active material matrix is too low in the positive electrode active material matrix suspension, the aluminum phosphate will not easily adhere the surface of the positive electrode active material matrix to form the aluminum phosphate layer.

In the preparation method of the modified positive electrode active material according to the first aspect of the present disclosure, in the obtained modified positive electrode active material, a mass ratio of the aluminum phosphate layer may be 0.03%~0.3% of the mass of the positive electrode active material matrix. If the mass of the aluminum phosphate layer is less than 0.03% of the mass of the positive electrode active material matrix, the aluminum phosphate layer will not completely coat the surface of the positive electrode active material matrix due to less content of the aluminum phosphate layer. If the mass ratio of the aluminum phosphate layer is more than 0.3% of the mass of the positive electrode active material matrix, the aluminum phosphate layer formed on the surface of the positive electrode active material matrix will be too thick, deintercalateion and intercalation of the metal ions (such as lithium ions) from the surface of the positive electrode active material matrix will become difficult, thereby resulting in an increase of internal polarization of the electrochemical energy storage device, increasing internal resistance of the electrochemical energy storage device, and deteriorating electrochemical performance of the electrochemical energy storage device.

In the preparation method of the modified positive electrode active material according to the first aspect of the present disclosure, in the prepared modified positive electrode active material, a thickness of the aluminum phosphate layer ranges from 5 nm to 70 nm.

In the preparation method of the modified positive electrode active material according to the first aspect of the present disclosure, a type of the alcohol solvent is not specifically limited and may be selected as desired, preferably, the alcohol solvent may be one or more selected from a group consisting of methanol, etanol, 1-propanol, isopropanol and 1-butanol, further preferably, the alcohol solvent may be selected from etanol.

In the preparation method of the modified positive electrode active material according to the first aspect of the present disclosure, in the step of obtaining a liquid-phase coating solution which contains aluminum phosphate, an acidity regulator may be added so as to adjust pH of reaction system. Preferably, the acidity regulator may be weak acid ammonium. Further preferably, the acidity regulator is one or more selected from a group consisting of ammonium acetate, ammonium bicarbonate and ammonium carbonate.

In the preparation method of the modified positive electrode active material according to the first aspect of the present disclosure, a mass ratio of the acidity regulator may be 3%~60% of a mass of the alcohol-soluble aluminum salt.

In the preparation method of the modified positive electrode active material according to the first aspect of the present disclosure, a type of the alcohol-soluble aluminum salt is not limited and may be selected as desired. Preferably, the alcohol-soluble aluminum salt is one or more selected from a group consisting of aluminum chloride, aluminum isopropoxide, aluminum acetylacetonate, trimethylaluminum and aluminum nitrate.

In the preparation method of the modified positive electrode active material according to the first aspect of the present disclosure, a type of the alcohol-soluble phosphorous compound is not limited and may be selected as desired. Preferably, the alcohol-soluble phosphorous compound is one or more selected from a group consisting of triethyl phosphate, phosphorous acid and phosphorus pentoxide.

In the preparation method of the modified positive electrode active material according to the first aspect of the present disclosure, an atomic ratio of Al in the alcohol-soluble aluminum salt solution and P in the alcohol-soluble phosphorous compound solution is 1:1.

In the preparation method of the modified positive electrode active material according to the first aspect of the present disclosure, a water-bath heating can be adopted after mixing the alcohol-soluble aluminum salt solution and the alcohol-soluble phosphorous compound solution to make them react, but the present disclosure is not limited to this, other heating methods are also used. A water-bath heating temperature ranges from 60~80° C., a water-bath heating time is not specifically limited and may be selected based on actual demands and environmental factor, taking the amount of the alcohol solvent in the preparation process into account, preferably, the water-bath heating time ranges from 1 h to 3 h.

In the preparation method of the modified positive electrode active material according to the first aspect of the present disclosure, in the liquid-phase coating solution which contains aluminum phosphate, a content of the aluminum phosphate is not specifically limited. In order to facilitate calculation of the amounts of the alcohol-soluble aluminum salt and the alcohol-soluble phosphorous compound in examples of the present disclosure, a mass ratio of the aluminum phosphate is set as 10% of the total mass of the liquid-phase coating solution, but the present disclosure is not limited to this.

In the preparation method of the modified positive electrode active material according to the first aspect of the present disclosure, a type of the positive electrode active material matrix is not limited, the preparation method of the modified positive electrode active material of the present disclosure is suitable for uniformly, continuously and densely coating the aluminum phosphate layer on the surface of various kinds of positive electrode active material matrix. Taking a lithium-ion secondary battery as an example, a general formula of the positive electrode active material matrix is $Li_aNi_xM_{1-x}O_2$, where, $0.9 \leq a \leq 1.2$, $0.5 \leq x < 1$, M is one or more selected from a group consisting of Co, Mn, Al, Mg, Fe, Cr, V, Ti, Cu, B, Ca, Zn, Zr, Nb, Mo, Sr, Sb, W and Bi. Preferably, the positive electrode active material matrix is one or more selected from a group consisting of $LiNi_{0.6}Co_{0.2}Mn_{0.2}O_2$, $LiNi_{0.8}Co_{0.1}Mn_{0.1}O_2$ and $LiNi_{0.8}Co_{0.15}Al_{0.05}O_2$.

In the preparation method of the modified positive electrode active material according to the first aspect of the present disclosure, a mixing and stirring time of the positive electrode active material matrix suspension and the liquid-phase coating solution which contains aluminum phosphate ranges from 30 min to 60 min.

In the preparation method of the modified positive electrode active material according to the first aspect of the present disclosure, the baking process may be performed in a muffle roaster, a baking temperature ranges from 300° C. to 700° C., a baking time ranges from 1 h to 10 h.

In the preparation method of the modified positive electrode active material according to the first aspect of the present disclosure, the baking process may be performed under air atmosphere or oxygen atmosphere.

Secondly, an electrochemical energy storage device according to a second aspect of the present disclosure is described.

The electrochemical energy storage device according to the second aspect of the present disclosure comprises the modified positive electrode active material obtained by the preparation method of the modified positive electrode active material according to the first aspect of the present disclosure.

In the electrochemical energy storage device according to the second aspect of the present disclosure, the electrochemical energy storage device comprises a positive electrode plate, a negative electrode plate, a separator and an electrolyte. The positive electrode plate comprises a positive electrode current collector and a positive electrode film provided on the positive electrode current collector, the positive electrode film comprises the modified positive electrode active material obtained by the preparation method of the modified positive electrode active material according to the first aspect of the present disclosure.

In the electrochemical energy storage device according to the second aspect of the present disclosure, the electrochemical energy storage device may be a supercapacitor, a lithium-ion secondary battery or a sodium-ion secondary battery. The positive electrode active material matrix is selected from different kinds according to the kind of the electrochemical energy storage device. The electrochemical energy storage device in examples of the present disclosure is only shown as a lithium-ion secondary battery, but the present disclosure is not limited to this.

In the lithium-ion secondary battery, the positive electrode current collector is an aluminum foil. Positive electrode conductive agent is one or more selected from a group consisting of acetylene black, conductive carbon black, carbon fibre (VGCF), carbon nanotube (CNT) and ketjen black.

In the lithium-ion secondary battery, the negative electrode plate comprises a negative electrode current collector and a negative electrode film provided on the negative electrode current collector. The negative electrode current collector is a copper foil. Negative electrode active material is one or more selected from a group consisting of artificial graphite and natural graphite. Negative electrode conductive agent is one or more selected from a group consisting of acetylene black, conductive carbon black (Super P, Super S, 350G), carbon fibre (VGCF), carbon nanotube (CNT) and ketjen black.

In the lithium-ion secondary battery, the electrolyte can be a liquid electrolyte, the electrolyte may comprise lithium salt and organic solvent.

In the lithium-ion secondary battery, a specific type of the lithium salt is not limited. Specifically, the lithium salt is one or more selected from a group consisting of $LiPF_6$, $LiBF_4$, $LiN(SO_2F)_2$ (abbreviated as LiFSI), $LiN(CF_3SO_2)_2$ (abbreviated as LiTFSI), $LiClO_4$, $LiAsF_6$, $LiB(C_2O_4)_2$ (abbreviated as LiBOB) and $LiBF_2C_2O_4$ (abbreviated as LiDFOB).

In the lithium-ion secondary battery, a specific type of the organic solvent is not specifically limited and may be selected as desire. Preferably, a non-aqueous organic solvent is used. The non-aqueous organic solvent may comprise any kind of carbonate ester and carboxylic ester. The carbonate ester comprises cyclic carbonate ester or chain carbonate ester. The non-aqueous organic solvent further comprises halogenated carbonate ester. Specifically, the organic solvent selected from a group consisting of ethylene carbonate (EC), propylene carbonate, butylene carbonate, pentylene carbonate, fluoroethylene carbonate, dimethyl carbonate (DMC), diethyl carbonate, dipropyl carbonate, ethyl methyl carbonate (EMC), γ-butyrolactone, methyl formate, ethyl formate, ethyl propionate, propyl propionate and tetrahydrofuran.

In the lithium-ion secondary battery, a type of the separator is not specifically limited and may be selected as desired.

Hereafter the present disclosure will be described in detail in combination with examples. It should be noted that, the examples described in the present disclosure are only used for explaining the present disclosure, and are not intended to limit the scope of the present disclosure. In the examples, the described electrochemical energy storage device is a lithium-ion secondary battery, but the present disclosure is not limited to this.

In the following examples, reagents, materials and instruments used are commercially available unless otherwise specified.

Example 1

(1) Preparation of a modified positive electrode active material: 52.6 g of aluminum isopropoxide was dissolved in 160 g of etanol to prepare an alcohol-soluble aluminum salt solution; then, 18.3 g of $P_2O_5$ was dissolved in 160 g of etanol to prepare an alcohol-soluble phosphorous compound solution, the alcohol-soluble aluminum salt solution and the alcohol-soluble phosphorous compound solution were mixed in a beaker and placed in water bath at 80° C. for 1 h, then 30.7 g of $NH_4HCO_3$ (acidity regulator) was gradually added; finally, etanol was added after the reaction was finished to obtain a total mass of 314 g of a mixed solution, that was, a liquid-phase coating solution which contained $AlPO_4$ was obtained, where, a content of $AlPO_4$ of the liquid-phase coating solution was 10% of a total mass of the liquid-phase coating solution. 4.00 Kg of uncoated positive electrode active material matrix $LiNi_{0.6}Co_{0.2}Mn_{0.2}O_2$ was dispersed in 1.20 Kg of etanol under stirring, the positive electrode active material matrix suspension with the positive electrode active material matrix uniformly dispersed was obtained; then, 120 g of the liquid-phase coating solution was added into the positive electrode active material matrix suspension and stirred for 30 min, which was followed by extraction filtrating to remove etanol and obtain filter cake, the filter cake then was performed for drying for 10 h under 80° C. in a vacuum oven to obtain dry powder, after that, the dry powder was placed in a saggar and then placed in a muffle roaster, and air was introduced into the muffle roaster, after baking for 5 h under 300° C., natural cooling was performed to obtain the modified positive electrode active material, that was, $LiNi_{0.6}Co_{0.2}Mn_{0.2}O_2$ with $AlPO_4$ layer coated on the surface uniformly, where an average thickness of the $AlPO_4$ layer was 50 nm.

(2) Preparation of an positive electrode plate: the modified positive electrode active material, acetylene black (positive electrode conductive agent) and polyvinylidene fluoride (PVDF, binder) according to a mass ratio of 95:3:2 were uniformly mixed with N-methyl-2-pyrrolidone (NMP, solvent) to form a positive electrode slurry, where a solid content of the positive electrode slurry was 40%, then the positive electrode slurry was uniformly coated on an aluminum foil (positive electrode current collector) with a thickness of 12 μm, baking was then performed for 5 h under 85° C., which was followed by cold-pressing under 8 MPa, after edge-trimming, slitting, slicing, baking at 85° C. for 4 h under vacuum and welding an electrode tab, the preparation of the positive electrode plate was finished.

(3) Preparation of a negative electrode plate: graphite (negative electrode active material), acetylene black (negative electrode conductive agent), SBR (binder) and CMC (thickening agent) according to a mass ratio of 95:2:1:1 were uniformly mixed with deionized water (solvent) to form a negative electrode slurry, where a solid content of the negative electrode slurry was 45%, then the negative electrode slurry was uniformly coated on a copper foil (negative electrode current collector), baking was then performed for 5 h under 85° C., which was followed by cold-pressing under 8 MPa, after edge-trimming, slitting, slicing, baking at 110° C. for 4 h under vacuum and welding an electrode tab, the preparation of the negative electrode plate was finished.

(4) Preparation of an electrolyte: in an argon atmosphere glove box in which the water content was less than 10 ppm, ethylene carbonate (EC), ethyl methyl carbonate (EMC) and dimethyl carbonate (DMC) according to a volume ratio of EC:EMC:DMC=1:1:1 were mixed to obtain a mixed organic solvent, then a fully dried lithium salt $LiPF_6$ was dissolved in the mixed organic solvent, the electrolyte was obtained after uniformly mixing, where a concentration of the $LiPF_6$ was 1M.

(5) Preparation of a separator: a poly(ethylene) (PE) film was used as the separator.

(6) Preparation of a lithium-ion secondary battery: the positive electrode plate, the separator, the negative electrode plate were laminated in order to make the separator separate the positive electrode plate from the negative electrode plate, then were wound to form an electrode assembly and placed in a package film, then the prepared electrolyte was injected, after sealing, standing-by, forming, shaping, capacity testing, the preparation of the lithium-ion secondary battery was finished.

Example 2

The preparation process was the same as example 1 except that in the preparation of the modified positive electrode active material (step (1)), 96.6 g of aluminum nitrate hydrate ($Al(NO_3)_3 \cdot 9H_2O$, it should be noted that the aluminum nitrate hydrate was an existence form of the aluminum nitrate in natural conditions) was dissolved in 160 g etanol to prepare an alcohol-soluble aluminum salt solution; then, 21.1 g of phosphorous acid was dissolved in 160 g etanol to prepare an alcohol-soluble phosphorous compound solution, the alcohol-soluble aluminum salt solution and the alcohol-soluble phosphorous compound solution were mixed in a beaker and placed in water bath at 80° C. for 1 h, then 3.50 g of ammonium acetate (acidity regulator) was gradually added; finally, etanol was added after the reaction was finished to obtain a total mass of 314 g of a mixed solution, that was, a liquid-phase coating solution which contained $AlPO_4$ was obtained, where, a content of $AlPO_4$ of the liquid-phase coating solution was 10% of a total mass of the liquid-phase coating solution. 4.00 Kg of uncoated positive electrode active material matrix $LiNi_{0.6}Co_{0.2}Mn_{0.2}O_2$ was dispersed in 1.60 Kg of etanol under stirring, the positive electrode active material matrix suspension with the positive electrode active material matrix uniformly dispersed was obtained; then, 60.0 g of the liquid-phase coating solution was added into the positive electrode active material matrix suspension and stirred for 30 min, which was followed by extraction filtrating to remove etanol, filter cake then was performed for drying for 10 h under 80° C. in a vacuum oven to obtain dry powder, after that, the dry powder was placed in a saggar and then placed in a muffle roaster, and air was introduced into the muffle roaster, after baking for 8 h under 600° C., natural cooling was performed to obtained the modified positive electrode active material, that was, $LiNi_{0.6}Co_{0.2}Mn_{0.2}O_2$ with $AlPO_4$ layer coated on the surface uniformly, where an average thickness of the $AlPO_4$ layer was 26 nm.

Example 3

The preparation process was the same as example 1 except that in the preparation of the modified positive electrode active material (step (1)), 96.6 g of aluminum nitrate hydrate ($Al(NO_3)_3 \cdot 9H_2O$, it should be noted that the aluminum nitrate hydrate was an existence form of the aluminum nitrate in natural conditions) was dissolved in 160 g of etanol to prepare an alcohol-soluble aluminum salt solution; then, 46.9 g of triethyl phosphate was dissolved in 160 g of etanol to prepare an alcohol-soluble phosphorous compound solution, the alcohol-soluble aluminum salt solution and the alcohol-soluble phosphorous compound solution were mixed in a beaker and placed in water bath at 80° C. for 1 h, then 38.7 g of ammonium acetate (acidity regulator) was added gradually; finally, etanol was added after the reaction was finished to obtain a total mass of 314 g of a mixed solution, that was, a liquid-phase coating solution which contained $AlPO_4$ was obtained, where, a content of $AlPO_4$ of the liquid-phase coating solution was 10% of a total mass of the liquid-phase coating solution. 4.00 Kg of uncoated positive electrode active material matrix $LiNi_{0.6}Co_{0.2}Mn_{0.2}O_2$ was dispersed in 2.00 Kg of etanol under stirring, the positive electrode active material matrix suspension with the positive electrode active material matrix uniformly dispersed was obtained; then, 32.0 g of the liquid-phase coating solution was added into the positive electrode active material matrix suspension and stirred for 45 min, which was followed by extraction filtrating to remove etanol and obtain filter cake, the filter cake then was performed for drying for 10 h under 80° C. in a vacuum oven to obtain dry powder, after that, the dry powder was placed in a saggar and then placed in a muffle roaster, and air was introduced into the muffle roaster, after baking for 1 h under 500° C., natural cooling was performed to obtained the modified positive electrode active material, that was, $LiNi_{0.6}Co_{0.2}Mn_{0.2}O_2$ with $AlPO_4$ layer coated on the surface uniformly, where an average thickness of the $AlPO_4$ layer was 15 nm.

Example 4

The preparation process was the same as example 1 except that in the preparation of the modified positive electrode active material (step (1)), 18.6 g of trimethylaluminum was dissolved in 160 g etanol to prepare an alcohol-soluble aluminum salt solution; then, 18.3 g of phosphorus pentoxide was dissolved in 160 g of etanol to prepare an alcohol-soluble phosphorous compound solution, the alcohol-soluble aluminum salt solution and the alcohol-soluble phosphorous compound solution were mixed in a beaker and placed in water bath at 80° C. for 1 h, then 3.97 g of acidity regulator ammonium carbonate was gradually added; finally, etanol was added after the reaction was finished to obtain a total mass of 314 g of a mixed solution, that was, a liquid-phase coating solution which contained $AlPO_4$ was obtained, where, a content of $AlPO_4$ of the liquid-phase coating solution was 10% of a total mass of the liquid-phase coating solution. 4.00 Kg of uncoated positive electrode active material matrix $LiNi_{0.5}Co_{0.2}Mn_{0.3}O_2$ was dispersed in 2.40 Kg of etanol under stirring, the positive electrode active material matrix suspension with the positive electrode active material matrix uniformly dispersed was obtained; then, 20.0 g of the liquid-phase coating solution was added into the positive electrode active material matrix suspension and stirred for 30 min, which was followed by extraction filtrating to remove etanol and obtain filter cake, filter cake then was performed for drying for 10 h under 80° C. in a vacuum oven to obtain dry powder, after that, the dry powder was placed in a saggar and then placed in a muffle roaster, and air was introduced into the muffle roaster, after baking for 3 h under 700° C., natural cooling was performed to obtained the modified positive electrode active material, that was, $LiNi_{0.5}Co_{0.2}Mn_{0.3}O_2$ with $AlPO_4$ layer coated on the surface uniformly, where an average thickness of the $AlPO_4$ layer was 10 nm.

Example 5

The preparation process was the same as example 1 except that in the preparation of the modified positive electrode active material (step (1)), 84.3 g of aluminum acetylacetonate was dissolved in 160 g of etanol to prepare an alcohol-soluble aluminum salt solution; then, 21.1 g of phosphorous acid was dissolved in 160 g of etanol to prepare an alcohol-soluble phosphorous compound solution, the alcohol-soluble aluminum salt solution and the alcohol-soluble phosphorous compound solution were mixed in a beaker and placed in water bath at 80° C. for 1 h, then 5.65 g of ammonium acetate (acidity regulator) was gradually added; finally, etanol was added after the reaction was finished to obtain a total mass of 314 g of a mixed solution, that was, a liquid-phase coating solution which contained $AlPO_4$ was obtained, where, a content of $AlPO_4$ of the liquid-phase coating solution was 10% of a total mass of the liquid-phase coating solution. 4.00 Kg of uncoated positive electrode active material matrix $LiNi_{0.8}Co_{0.1}Mn_{0.1}O_2$ was dispersed in 2.40 Kg of etanol under stirring, the positive electrode active material matrix suspension with the positive electrode active material matrix uniformly dispersed was obtained; then, 12.0 g of the liquid-phase coating solution was added into the positive electrode active material matrix suspension and stirred for 60 min, which was followed by extraction filtrating to remove etanol and obtain filter cake, the filter cake then was performed for drying for 10 h under 80° C. in a vacuum oven to obtain dry powder, after that, the dry powder was placed in a saggar and then placed in a muffle roaster, and oxygen was introduced into the muffle roaster, after baking for 7 h under 400° C., natural cooling was performed to obtained the modified positive electrode active material, that was, that is $LiNi_{0.8}Co_{0.1}Mn_{0.1}O_2$ with $AlPO_4$ layer coated on the surface uniformly, where an average thickness of the $AlPO_4$ layer was 5 nm.

Example 6

The preparation process was the same as example 1 except that in the preparation of the modified positive electrode active material (step (1)), 34.3 g of aluminum chloride was dissolved in 160 g etanol to prepare an alcohol-soluble aluminum salt solution; then, 46.9 g of triethyl phosphate was dissolved in 160 g of etanol to prepare of an alcohol-soluble phosphorous compound solution, the alcohol-soluble aluminum salt solution and the alcohol-soluble phosphorous compound solution were mixed in a beaker and placed in water bath at 80° C. for 1 h, then 2.68 g of ammonium carbonate (acidity regulator) was gradually added; finally, etanol was added after the reaction was finished to obtain a total mass of 314 g of a mixed solution, that was, a liquid-phase coating solution which contained $AlPO_4$ was obtained, where, a content of $AlPO_4$ of the liquid-phase coating solution was 10% of a total mass of the liquid-phase coating solution. 4.00 Kg of uncoated positive electrode active material matrix $LiNi_{0.8}Co_{0.15}Al_{0.05}O_2$ was dispersed in 2.80 Kg of etanol under stirring, the positive electrode active material matrix suspension with the positive electrode active material matrix uniformly dispersed was obtained; then, 80.0 g of the liquid-phase coating solution was added into the positive electrode active material matrix suspension and stirred for 30 min, which was followed by extraction filtrating to remove etanol and obtain filter cake, the filter cake then was performed for drying for 10 h under 80° C. in a vacuum oven to obtain dry powder, after that, the dry powder was placed in a saggar and then placed in a muffle roaster, and oxygen was introduced into the muffle roaster, after baking for 10 h under 300° C., natural cooling was performed to obtained the modified positive electrode active material, that was, $LiNi_{0.8}Co_{0.15}Al_{0.05}O_2$ with $AlPO_4$ layer coated on the surface uniformly, where an average thickness of the $AlPO_4$ layer was 35 nm.

Comparative Example 1

The preparation process was the same as example 1 except that in the preparation of the modified positive electrode active material (step (1)), commercial $LiNi_{0.6}Co_{0.2}Mn_{0.2}O_2$ powders were directly used as the positive electrode active material and there was no coating modification.

Comparative Example 2

The preparation process was the same as example 1 except that in the preparation of the modified positive electrode active material (step (1)), commercial $LiNi_{0.8}Co_{0.1}Mn_{0.1}O_2$ powders were directly used as the positive electrode active material and there was no coating modification.

Comparative Example 3

The preparation process was the same as example 1 except that in the preparation of the modified positive electrode active material (step (1)), commercial $LiNi_{0.8}Co_{0.15}Al_{0.05}O_2$ powders were directly used as the positive electrode active material and there was no coating modification.

Comparative Example 4

The preparation process was the same as example 1 except that in the preparation of the modified positive electrode active material (step (1)), 12.0 g of nano-aluminum phosphate and 4.00 Kg of uncoated $LiNi_{0.6}Co_{0.2}Mn_{0.2}O_2$ were placed in a blender mixer to solid phase mix for 5 h, then powders after solid phase mixing were taken out to place in a saggar and then placed in a muffle roaster, and air was introduced into the muffle roaster, after baking for 5 h under 600° C., natural cooling was performed to obtained the $LiNi_{0.6}Co_{0.2}Mn_{0.2}O_2$ coated with the aluminum phosphate.

Comparative Example 5

The preparation process was the same as example 1 except that in the preparation of the preparation of the modified positive electrode active material (step (1)), 12.0 g of nano-aluminum phosphate and 4.00 Kg of uncoated $LiNi_{0.8}Co_{0.1}Mn_{0.1}O_2$ were placed in a blender mixer to solid phase mix for 5 h, then powders after solid phase mixing were taken out to place in a saggar and then placed in a muffle roaster, and air was introduced into the muffle roaster, after baking for 5 h under 600° C., natural cooling was performed to obtained the $LiNi_{0.8}Co_{0.1}Mn_{0.1}O_2$ coated with the aluminum phosphate.

Comparative Example 6

The preparation process was the same as example 1 except that in the preparation of the preparation of the modified positive electrode active material (step (1)), 12.0 g of nano-aluminum phosphate and 4.00 Kg of uncoated $LiNi_{0.8}Co_{0.15}Al_{0.05}O_2$ were placed in a blender mixer to solid phase mix for 5 h, then powders after solid phase mixing were taken out to place in a saggar and then placed in a muffle roaster, and air was introduced into the muffle roaster, after baking for 5 h under 600° C., natural cooling was performed to obtained the $LiNi_{0.8}Co_{0.15}Al_{0.05}O_2$ with the aluminum phosphate coated.

cycle was repeated for 500 times, the discharge capacity of $500^{th}$ of the lithium-ion secondary battery was recorded.

Capacity retention rate after 500 cycles under 25° C. of the lithium-ion secondary battery (%)=(dis-

TABLE 1

Parameters of addition amount of raw material of examples 1-6

| | Liquid-phase coating solution | | | | | Acidity regulator | | |
|---|---|---|---|---|---|---|---|---|
| | Alcohol-soluble aluminum salt | | Alcohol-soluble phosphorous compound | | | Mass ratio relative to alcohol-soluble | Positive electrode active material matrix | |
| | Type | Mass/g | Type | Mass/g | Type | aluminum salt | Type | Mass/Kg |
| Example 1 | Aluminum isopropoxide | 52.6 | Phosphorus pentoxide | 18.3 | Ammonium bicarbonate | 58.4% | $LiNi_{0.6}Co_{0.2}Mn_{0.2}O_2$ | 4.00 |
| Example 2 | Aluminum nitrate | 96.6 | Phosphorous acid | 21.1 | Ammonium acetate | 3.60% | $LiNi_{0.6}Co_{0.2}Mn_{0.2}O_2$ | 4.00 |
| Example 3 | Aluminum nitrate | 96.6 | Tiethyl phosphate | 46.9 | Ammonium acetate | 40.1% | $LiNi_{0.6}Co_{0.2}Mn_{0.2}O_2$ | 4.00 |
| Example 4 | Trimethylaluminum | 18.6 | Phosphorus pentoxide | 18.3 | Ammonium carbonate | 21.4% | $LiNi_{0.6}Co_{0.2}Mn_{0.2}O_2$ | 4.00 |
| Example 5 | Aluminum acetylacetonate | 84.3 | Phosphorous acid | 21.1 | Ammonium acetate | 6.70% | $LiNi_{0.8}Co_{0.1}Mn_{0.1}O_2$ | 4.00 |
| Example 6 | Aluminum chloride | 34.3 | Triethyl phosphate | 46.9 | Ammonium carbonate | 7.80% | $LiNi_{0.8}Co_{0.15}Al_{0.05}O_2$ | 4.00 |

TABLE 2

Parameters of preparation method of examples 1-6 and comparative examples 1-6

| | Stirring time/min | Baking atmosphere | Baking temperature/° C. | Baking time/h | Average thickness of coating layer/nm |
|---|---|---|---|---|---|
| Example 1 | 30 | Air | 300 | 5 | 50 |
| Example 2 | 30 | Air | 600 | 8 | 26 |
| Example 3 | 45 | Air | 500 | 1 | 15 |
| Example 4 | 30 | Air | 700 | 3 | 10 |
| Example 5 | 60 | Oxygen | 400 | 7 | 5 |
| Example 6 | 30 | Oxygen | 300 | 10 | 35 |
| Comparative example1 | / | / | / | / | / |
| Comparative example2 | / | / | / | / | / |
| Comparative example3 | / | / | / | / | / |
| Comparative example4 | / | Air | 600 | 5 | Non-uniform, discontinuous coating layer |
| Comparative example5 | / | Air | 600 | 5 | Non-uniform, discontinuous coating layer |
| Comparative example6 | / | Air | 600 | 5 | Non-uniform, discontinuous coating layer |

Finally, test processes and test results of the lithium-ion secondary batteries were described.

(1) Testing of Cycle Performance of the Lithium-Ion Secondary Battery

At 25° C., the lithium-ion secondary battery was charged to an upper limit voltage of 4.3V at a constant current of 1 C (that was the current that the theoretical capacity was completely discharged in 1 h), then the lithium-ion secondary battery was charged to a current of 0.05 C at a constant voltage of 4.3V, then the lithium-ion secondary battery was discharged to a final voltage of 2.8V at a constant current of 1 C, discharged capacity of first cycle of the lithium-ion secondary battery was recorded, then the charged-discharge cycle was repeated for 500 times, the discharge capacity of $500^{th}$ of the lithium-ion secondary battery was recorded.

charge capacity of $500^{th}$ cycle/discharged capacity of first cycle)×100%.

(2) Testing High Temperature Storage Performance of the Lithium-Ion Secondary Battery At 25° C., the lithium-ion secondary battery was charged to 4.3V at a constant current of 0.33 C, then the lithium-ion secondary battery was further charged to a current less than 0.05 C at a constant voltage of 4.3V to make the lithium-ion secondary battery fully charged at 4.3V, the volume of the lithium-ion secondary battery was measured by using the drainage method and remarked as V0, then the lithium-ion secondary battery was stored under 85° C. in a baking oven, the volume change was measured every 24 h for 4 days, then the lithium-ion secondary battery was taken out and cooled to room temperature, the volume after stored for 4 days was measured again by the drainage method and remarked as V1.

Volume expansion rate after stored for 4 days under 85° C. of the lithium-ion secondary battery (%)=(V1−V0)/V0×100%

TABLE 3

Results of examples 1-6 and comparative examples 1-6

|  | Volume expansion rate after stored for 4 days under 85° C. (%) | Capacity retention rate after 500 cycles under 25° C./% |
|---|---|---|
| Example 1 | 38.0% | 90.1% |
| Example 2 | 39.0% | 89.6% |
| Example 3 | 39.2% | 88.8% |
| Example 4 | 39.8% | 88.1% |
| Example 5 | 47.2% | 82.9% |
| Example 6 | 45.8% | 84.0% |
| Comparative example 1 | 65.6% | 85.8% |
| Comparative example 2 | 71.0% | 78.6% |
| Comparative example 3 | 68.9% | 80.9% |
| Comparative example 4 | 44.0% | 87.5% |
| Comparative example 5 | 51.3% | 80.2% |
| Comparative example 6 | 49.7% | 81.4% |

Figure 2:
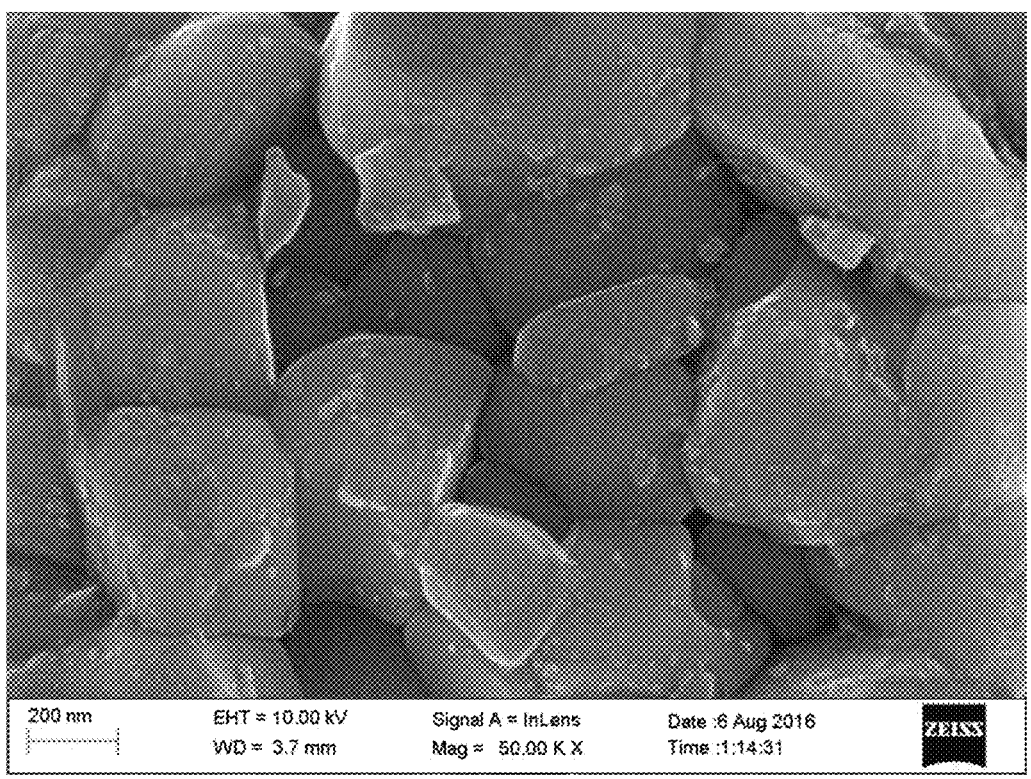
FIG. 2 illustrated a SEM picture of a modified positive electrode active material obtained by solid phase mixed coating in comparative example 4.
Figure 3:
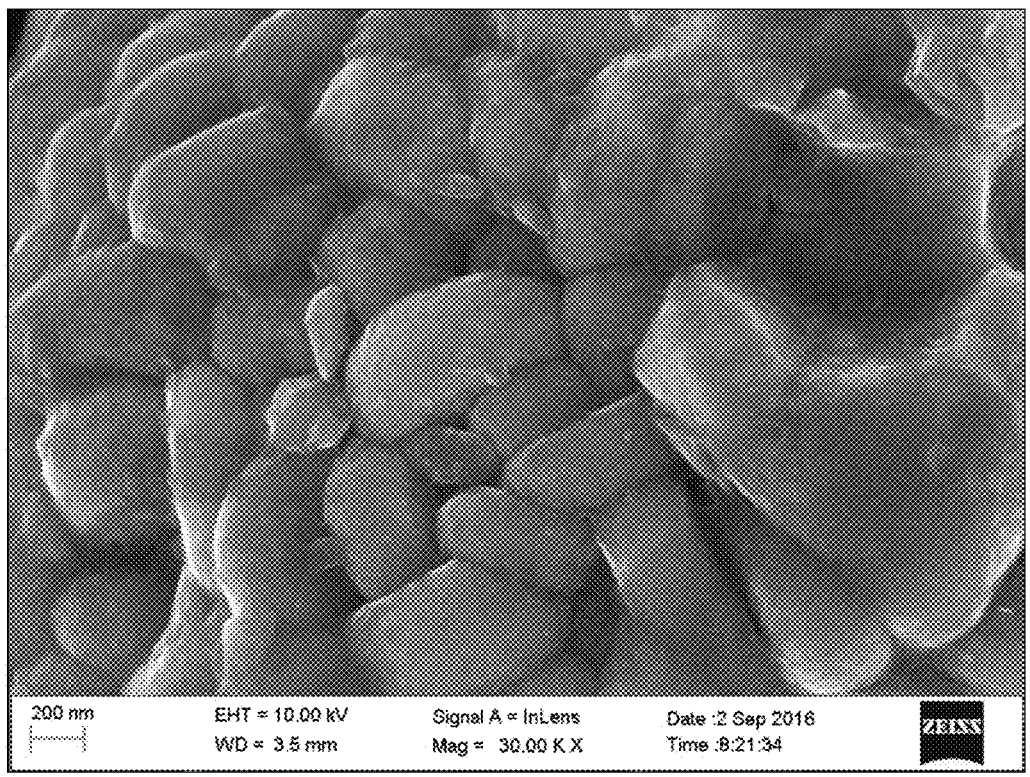
FIG. 3 illustrated a SEM picture of a modified positive electrode active material obtained by liquid-phase coating method in example 1.

It could be seen from relevant data of table 1, table 2 and table 3, the modified positive electrode active material obtained by the preparation method of the present disclosure could make the lithium-ion secondary battery have better cycle performance and high temperature storage performance. FIG. 1, FIG. 2 and FIG. 3 respectively were a SEM picture of the positive electrode active material without coating modification (comparative example 1), a SEM picture the modified positive electrode active material by solid phase mixed coating (comparative example 4) and a SEM picture of modified positive electrode active material obtained by the liquid-phase coating method of the present disclosure (example 1). Compared with FIG. 1, discontinuous point or block coating layer was formed on the surface of the modified positive electrode active material obtained by solid phase mixed coating in FIG. 2, where, there was no coating layer on partial area, the coating layer showed non-uniform and discontinuous, especially there was basically no coating layer on the surface of primary particle of the positive electrode active material matrix inside the positive electrode active material matrix, however the modified positive electrode active material obtained by the liquid-phase coating method of the present disclosure, which was referred to FIG. 3, coating layer was uniformly, continuously and densely coated on the surface of the positive electrode active material matrix, especially there was uniform coating layer on the surface of the primary particle inside the positive electrode active material matrix.

Figure 4:
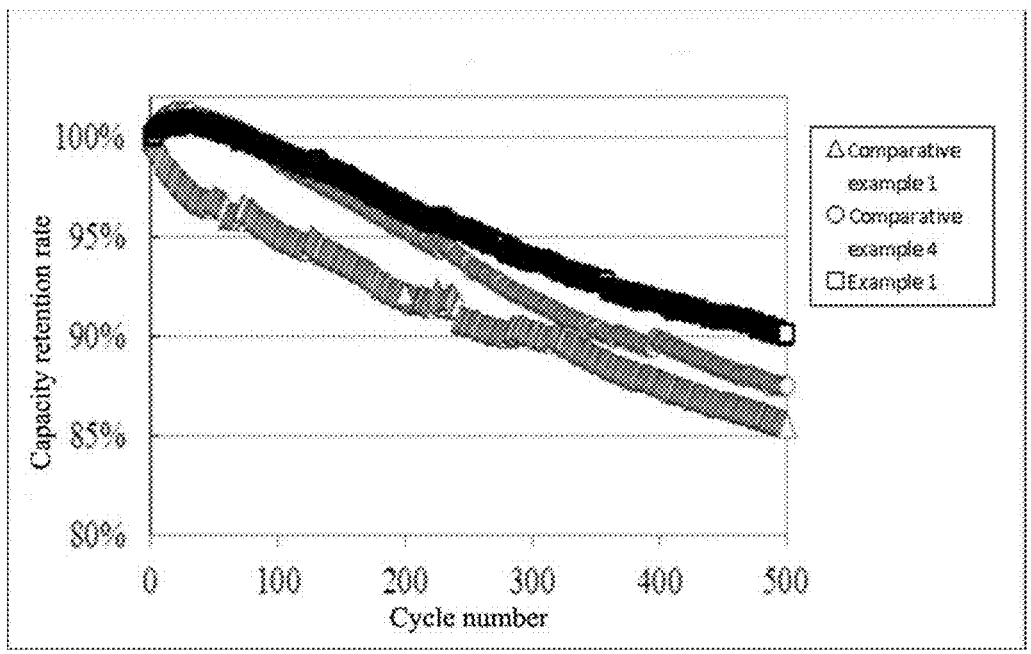
FIG. 4 illustrated cycle performance curves of example 1, comparative example 1 and comparative example 4.
Figure 5:
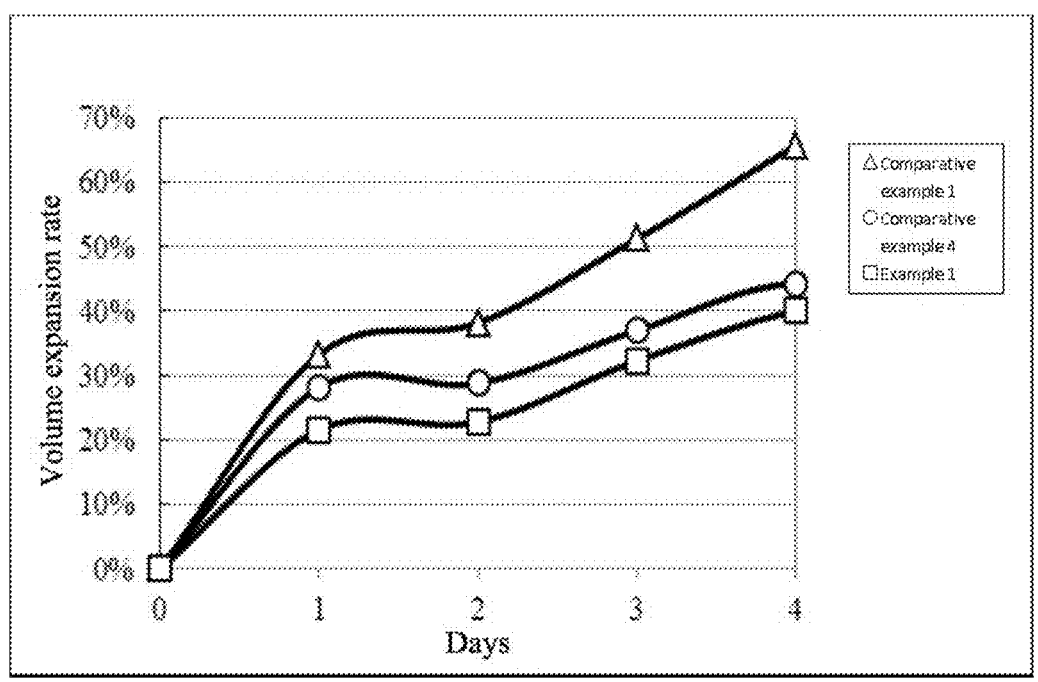
FIG. 5 illustrated volume expansion rate curves of example 1, comparative example 1 and comparative example 4.

FIG. 4 and FIG. 5 respectively illustrated cycle performance curve and volume expansion rate curve of example 1, comparative example 1 and comparative example 4. In comparative example 1, since there was no protection of the aluminum phosphate layer, the direct contact between the positive electrode active material and the electrolyte would lead increment of the side reactions therebetween, the volume expansion rate after high temperature storage of the lithium-ion secondary battery was too large. However since the aluminum phosphate layer uniformly, continuously and densely coated on the surface of the positive electrode active material matrix in example 1 obtained by the preparation method of the present disclosure, the direct contact between the electrolyte and the positive electrode active material matrix was isolated to a great extent, and the side reactions between the positive electrode active material matrix and the electrolyte were reduced, thereby the volume expansion rate after high temperature storage of the lithium-ion secondary battery was reduced obviously, meanwhile cycle performance was improved obviously. In comparative example 4, there was no uniform and continuous coating layer formed on the surface of the positive electrode active material matrix of the modified positive electrode active material obtained by solid phase mixed coating, therefore the direct contact between the positive electrode active material matrix and the electrolyte could not be effectively reduced, there was still plenty of side reactions between the positive electrode active material matrix and the electrolyte, thereby the improvement of the cycle performance and the high temperature storage performance of the lithium-ion secondary battery was not obvious.

Therefore, the preparation method of the modified positive electrode active material could uniformly, continuously and densely coat the aluminum phosphate layer on the surface of the positive electrode active material matrix so as to effectively isolate direct contact between the positive electrode active material matrix and an electrolyte, and reduce side reactions between the positive electrode active material matrix and the electrolyte, and reduce gas production of an electrochemical energy storage device and improve high temperature storage performance of the electrochemical energy storage device. Meanwhile the modified positive electrode active material obtained by which had excellent structure stability, and could effectively improve cycle stability of the electrochemical energy storage device.

What is claimed:

1. A preparation method of a modified positive electrode active material, which comprising steps of:
   dispersing a positive electrode active material matrix into an alcohol solvent to form a positive electrode active material matrix suspension;
   dissolving an alcohol-soluble aluminum salt in an alcohol solvent to form an alcohol-soluble aluminum salt solution;
   dissolving an alcohol-soluble phosphorous compound in an alcohol solvent to form an alcohol-soluble phosphorous compound solution;
   mixing the alcohol-soluble aluminum salt solution and the alcohol-soluble phosphorous compound solution and heating to react, obtaining a liquid-phase coating solution which contains aluminum phosphate after the reaction is finished;
   mixing and stirring the positive electrode active material matrix suspension and the liquid-phase coating solution which contains aluminum phosphate, extraction filtrating and obtaining a filter cake after the stirring is finished, then drying and baking the filter cake, finally obtaining a modified positive electrode active material in which an aluminum phosphate layer is uniformly coated on a surface of the positive electrode active material matrix;
   wherein, in the positive electrode active material matrix suspension, a mass ratio of the alcohol solvent is from 30% to 70% of a mass of the positive electrode active material matrix; and a general formula of the positive electrode active material matrix is $Li_aNi_xM_{1-x}O_z$, where, $0.9 \leq a \leq 1.2$, $0.5 \leq x < 1$, M is one or more selected from the group consisting of Co, Mn, Al, Mg, Fe, Cr, V, Ti, Cu, B, Ca, Zn, Zr, Nb, Mo, Sr, Sb, W and Bi.

2. The preparation method of the modified positive electrode active material according to claim 1, wherein in the obtained modified positive electrode active material, a mass ratio of the aluminum phosphate layer is from 0.03% to 0.3% of a mass of the positive electrode active material matrix.

3. The preparation method of the modified positive electrode active material according to claim 1, wherein in the obtained modified positive electrode active material, a thickness of the aluminum phosphate layer ranges from 5 nm to 70 nm.

4. The preparation method of the modified positive electrode active material according to claim 1, wherein the alcohol solvent is one or more selected from a group consisting of methanol, ethanol, 1-propanol, isopropanol and 1-butanol.

5. The preparation method of the modified positive electrode active material according to claim 4, wherein the alcohol solvent is ethanol.

6. The preparation method of the modified positive electrode active material according to claim 1, wherein an acidity regulator is added to adjust pH of reaction system in the step of obtaining a liquid-phase coating solution which contains aluminum phosphate.

7. The preparation method of the modified positive electrode active material according to claim 6, wherein the acidity regulator is weak acid ammonium.

8. The preparation method of the modified positive electrode active material according to claim 6, wherein the acidity regulator is one or more selected from a group consisting of ammonium acetate, ammonium bicarbonate and ammonium carbonate.

9. The preparation method of the modified positive electrode active material according to claim 1, wherein the alcohol-soluble aluminum salt is one or more selected from a group consisting of aluminum chloride, aluminum isopropoxide, aluminum acetylacetonate, trimethylaluminum and aluminum nitrate.

10. The preparation method of the modified positive electrode active material according to claim 1, wherein the alcohol-soluble phosphorous compound is one or more selected from a group consisting of triethyl phosphate, phosphorous acid and phosphorus pentoxide.

11. The preparation method of the modified positive electrode active material according to claim 1, wherein a baking temperature ranges from 300° C. to 700° C., a baking time ranges from 1 h to 10 h.

* * * * *